United States Patent [19]

Graton

[11] Patent Number: 5,117,959

[45] Date of Patent: Jun. 2, 1992

[54] TORSION DAMPING DEVICE, IN PARTICULAR FOR AUTOMOTIVE VEHICLES

[75] Inventor: Michel Graton, Paris, France

[73] Assignee: VALEO, Paris, France

[21] Appl. No.: 518,652

[22] Filed: May 2, 1990

[30] Foreign Application Priority Data

May 2, 1989 [FR] France ................. 89 05797

[51] Int. Cl.$^5$ ........................ F16D 3/14; F16D 3/66
[52] U.S. Cl. .................... 192/106.2; 464/68
[58] Field of Search ............. 192/106.2, 106.1, 70.17, 192/30 V; 464/66, 68

[56] References Cited

U.S. PATENT DOCUMENTS

| 4,212,380 | 7/1980 | Billet | 192/106.2 |
| 4,655,337 | 4/1987 | Carmillet et al. | 192/106.2 |
| 4,669,595 | 6/1987 | Fischer et al. | 192/106.2 |
| 4,685,896 | 8/1987 | Carmillet et al. | 464/68 |
| 4,789,053 | 12/1988 | Fischer et al. | 192/106.2 |
| 4,883,156 | 11/1989 | Rohrle et al. | 192/106.2 |

FOREIGN PATENT DOCUMENTS

| 2558907 | 8/1985 | France. | |
| 2184812 | 7/1987 | United Kingdom | 192/106.2 |

Primary Examiner—Richard Lorence
Attorney, Agent, or Firm—Longacre & White

[57] ABSTRACT

A torsion damping device includes a damper plate, a hub and a guide ring, all mounted coaxially with each other, together with a draw ring and a contact ring. A resilient gripping spring associated with the draw ring is, with the latter, confined axially between the contact ring and the damper plate, by virtue of an axial protuberance which is fixed with respect to at least one of the damper plate and contact ring. The draw ring engages on one of the two elements comprising the damper plate and the contact ring under the influence of the resilient gripping spring the latter engaging on the other one of these two elements.

7 Claims, 3 Drawing Sheets $$J_1 - J_2 \leq J_3 \leq J_1 + J_2$$

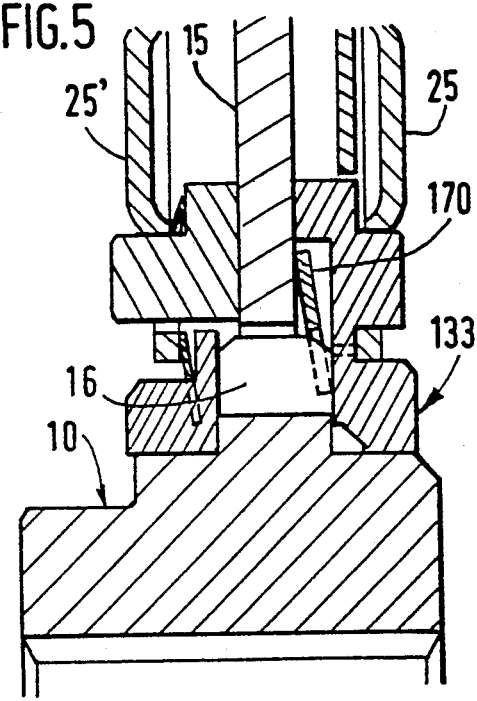
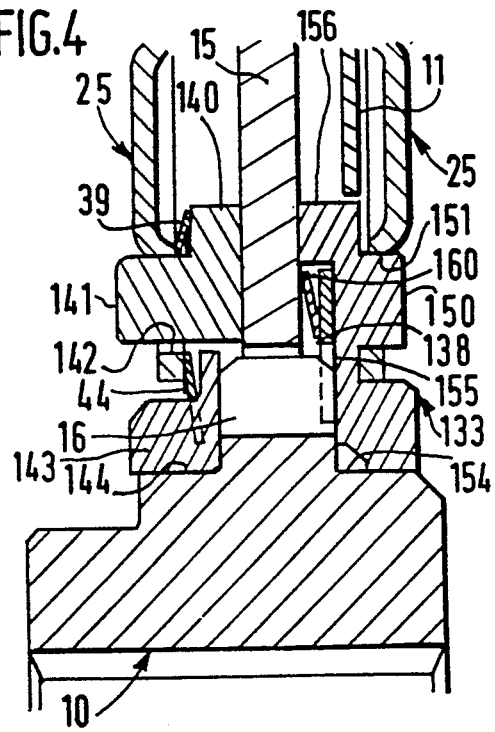
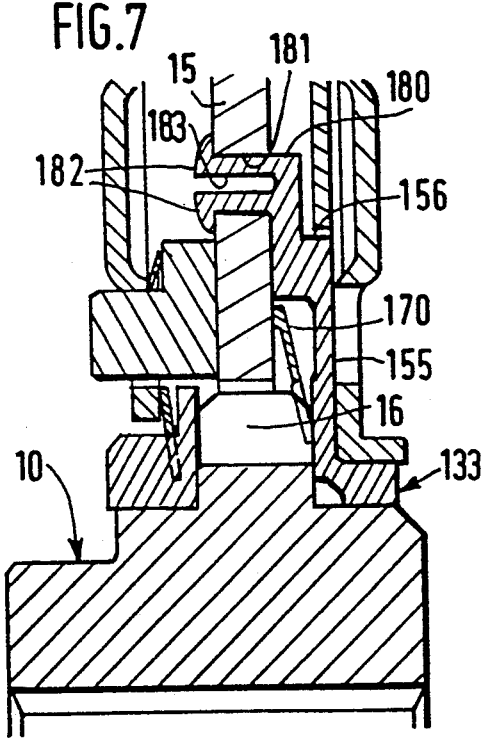
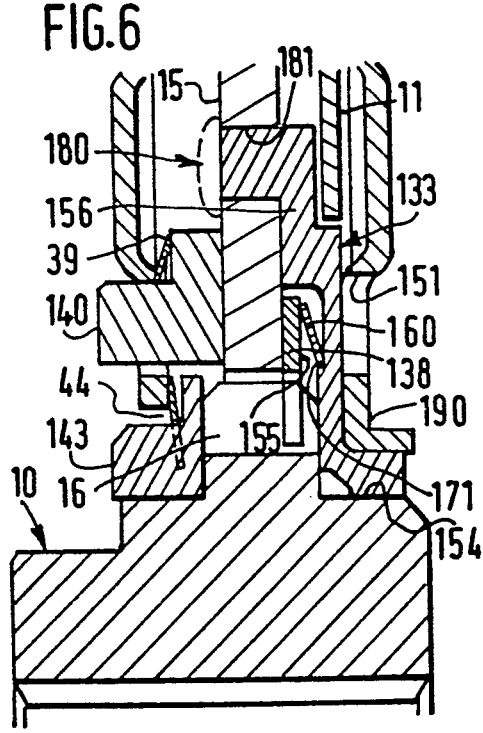

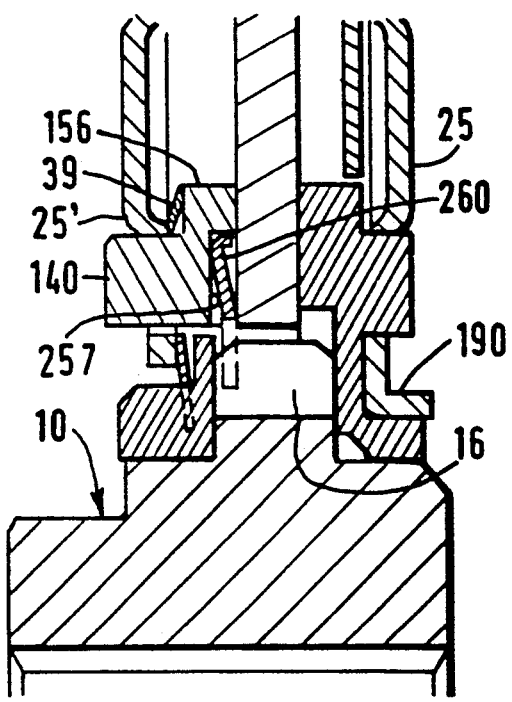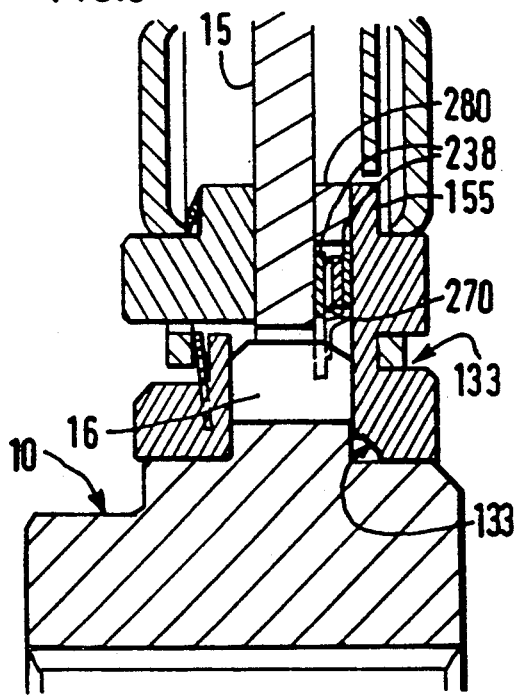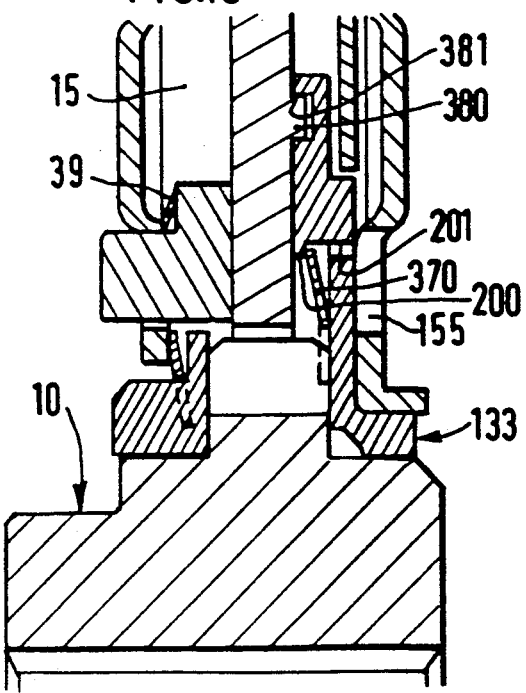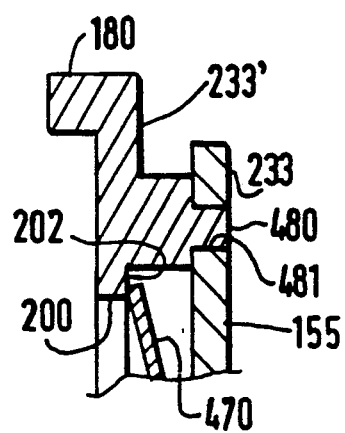

TORSION DAMPING DEVICE, IN PARTICULAR FOR AUTOMOTIVE VEHICLES

FIELD OF THE INVENTION

The present invention relates generally to torsion damping devices, in particular for clutches for automotive vehicles, of the kind comprising, firstly two coaxial elements, namely a hub and a radial damper plate arranged annularly around the said hub, the said coaxial elements being mounted for rotation of one with respect to the other against the action of resilient centring means and over a predetermined sector of angular displacement which is limited by loose meshing means which are provided between the said elements, with one of the said elements comprising for this purpose at least one radially extending tooth means, such as teeth or recesses, engaged with a circumferential clearance in a radially extending tooth means, such as recesses or teeth, which is comprised in the other one of the said elements and which is aligned with the aforementioned tooth means.

BACKGROUND OF THE INVENTION

In one kind of torsion damping device the two coaxial elements together form part of a first part of the device with which a second part of the device is coaxially associated. This second part is itself mounted in facing relationship with the said first part, for rotation within the limits of a predetermined angular displacement and against the action of resilient return means interposed circumferentially between the two said parts. The second of the said parts carries a support, and includes two guide rings which are arranged on either side of the damper plate. The said resilient return means have a stiffness which is greater than that of the resilient centring means.

An arrangement of the above kind is described in, for example, U.S. Pat. No. 4,212,380 and the corresponding French published patent application No. FR 2 386 729A. In that document, an arrangement is proposed in which a friction ring, referred to as a draw ring, is arranged for circumferential sliding movement. The draw ring includes at its inner periphery at least one radially extending tooth means, and is engaged with a circumferential clearance in the corresponding tooth means of the hub. By virtue of this arrangement, the friction torque which is developed between the above mentioned elements of the torsion damping device enables the consequences of any possible bouncing to be suppressed, by providing an accelerated damping of the bouncing movements, while also attenuating the shocks caused by contact of the teeth of the damper plate with the recesses between the teeth of the hub and vice versa.

In practical terms, the draw ring is subjected to the action of a first resilient gripping means, which takes the form of a calibrated resilient gripping ring which bears against a friction ring inserted axially between the damper plate and one of the guide rings. The said resilient gripping ring bears on the other guide ring so as to bias a thrust ring, which is for convenience referred to as a contact ring, towards the damper plate, and the draw ring is gripped between the contact ring and the damper plate. In order to produce a good vibration damping effect, the said draw ring is arranged to exert its forces before the damper plate has become fully meshed with the hub for rotation with the latter.

Even so, a difficulty remains in that the calibration of the resilient ring is not necessarily well adapted to the action of the draw ring, since the gripping effect can be too severe.

DISCUSSION OF THE INVENTION

An object of the present invention is to overcome these disadvantages, and to provide a novel arrangement in which the draw ring is gripped independently without involving any significant modification of the torsion damping device.

In accordance with the invention, there is provided a torsion damping device, in particular for clutches for automotive vehicles, of the kind defined above under "Field of the Invention", comprising firstly the two said coaxial elements with their resilient centring means and loose meshing means between the said elements, and secondly, a friction ring arranged for circumferential sliding movement and referred to as a draw ring, comprising at its inner periphery at least one radially extending tooth means, such as teeth or recesses, which is of the same type as the tooth means of the said damper plate and which, like the latter, is engaged in the corresponding tooth means of the hub, wherein the two said coaxial elements form part of a first part with which is coaxially associated a second part comprising two guide rings arranged on either side of the damper plate, the said second part being itself mounted for rotation in opposed facing relationship with the first part within the limits of a predetermined angular displacement and against the action of circumferentially acting resilient return means which are interposed between the said parts and which are of greater stiffness than the resilient centring means, a contact ring being biassed towards the damper plate under the influence of a first resilient gripping means which bears on one of the guide rings, the torsion damping device being characterised in that second resilient gripping means are associated with the said draw ring, in that the second resilient gripping means and the draw ring are confined axially between the contact ring and the damper plate by virtue of an axial protuberance which is fixed with respect to at least one of the said damper plate and contact ring, and in that the draw ring bears on one of the said damper plate or contact ring under the influence of the second resilient gripping means engaging on the other one of the said contact ring or damper plate or on the axial protuberance.

By virtue of this arrangement, it is possible to grip the draw ring resiliently and independently without any great modification of the torsion damping device, the gripping force of the said first resilient means being transmitted through the protuberance or axial spacer.

The associated second resilient gripping means may comprise an independent resilient ring; or, in a modification, the draw ring may be resilient. It even becomes possible to use two draw rings, with the second resilient gripping means interposed between them.

In practice, the stiffness of the second resilient gripping means is lower than that of the first resilient gripping means; and preferably, in order to avoid full relaxation of the first resilient means, the second resilient means are arranged to engage on a shoulder of the axial protuberance. The latter may if desired be discontinuous.

In one group of embodiments of the invention, the contact ring may be coupled to the guide ring for rotation with the latter. However, it is preferably coupled for rotation with the damper plate, so that after the clearance in the loose meshing means has been taken up, there will be no relative movement between the draw ring and the combination of the contact ring and damper plate.

The description which follows illustrates the invention, by way of example only, with reference to the accompanying drawings, in various embodiments of the invention, with a prior art arrangement being also described and shown so that the various features and advantages of the invention will be clearly understood.

BRIEF DESCRIPTION OF THE DRAWINGS

FIGS. 4 to 10 are views similar to FIG. 2, but show various examples of embodiments of the present invention.

FIG. 11 is a partial view in axial cross section, showing a modified version of the contact ring.

DESCRIPTION OF PREFERRED EMBODIMENTS OF THE INVENTION

Figure 1:
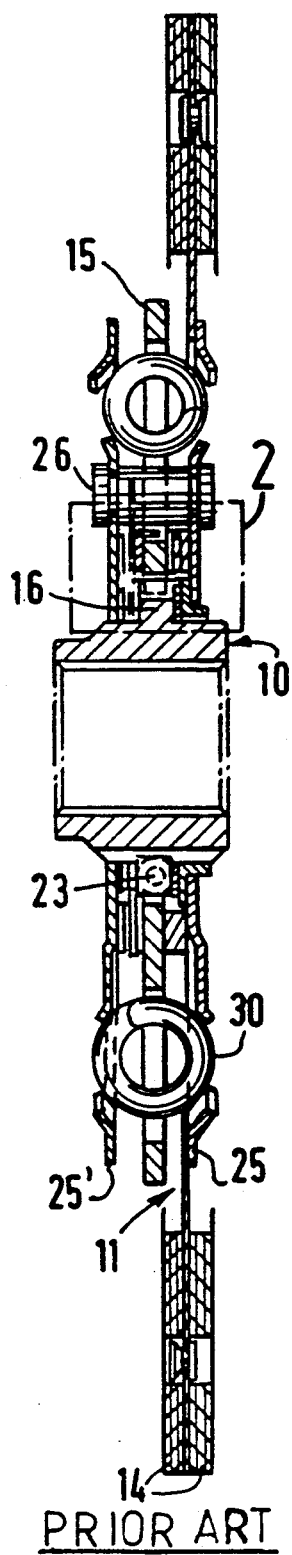
FIG. 1 is a view in axial cross section showing a torsion damping device of the prior art, identical with FIG. 2 in U.S. Pat. No. 4,212,380 and the corresponding French published patent application FR 2 386 729A.

In the drawings, the torsion damping device, or torsion damper, is in the form of a friction clutch, more particularly for automotive vehicles. Such a friction clutch includes two coaxial parts which are mounted for relative rotation with respect to each other, within the limits of a predetermined sector of relative angular displacement and against the action of circumferentially acting resilient return means. One of the two said coaxial parts comprises a hub 10, while the other includes a friction disc 11.

The hub 10 is fixed with respect to the driven input shaft of the gearbox, for rotation with this driven shaft, and is provided with a splined internal bore for coupling it in rotation with the said shaft, which is not shown.

The friction disc 11 carries at its periphery, and on each of its faces, friction liners 14 which are such as to couple it in rotation with the engine crankshaft of the automotive vehicle, by gripping action between a pressure plate and a reaction plate, neither of which is shown. The first of these two said coaxial parts includes, besides the hub 10, a radial damper plate 15 which is arranged annularly around the middle part of the hub 10. The hub and the damper plate constitute two coaxial elements which are mounted for rotation with respect to each other over a predetermined sector of angular displacement, with a loose meshing means coupling the hub and damper plate together.

The loose meshing means are formed partly on the inner periphery of the damper plate 15 and partly on the outer periphery of the hub 10, for which purpose the latter has a projecting radial flange 16. On the outer periphery of the flange 16, a plurality of recesses 17 are formed. The recesses 17 are generally trapezoidal in shape and are similar to each other, being spaced apart circumferentially at regular intervals and defining between each recess 17 and the next a tooth 18, which is of course therefore also trapezoidal in shape. The damper plate 15 has on its inner periphery a plurality of radial teeth 19 which lie facing towards the flange 16.

The teeth 19, which are once again of trapezoidal shape and circumferentially spaced apart at regular intervals, define between each tooth and the next a recess 20, such that the teeth 19 extend into the recesses 17 with a clearance, while the teeth 18 similarly penetrate with a clearance into the recesses 20. In this connection reference is made to FIG. 3, in which a symmetrical clearance J1 is shown for the rest position of the assembly. It will however be understood that in this rest position, the arrangement may be asymmetrical, with any given tooth having a clearance at one of its flanks different from that at the other.

Figure 3:
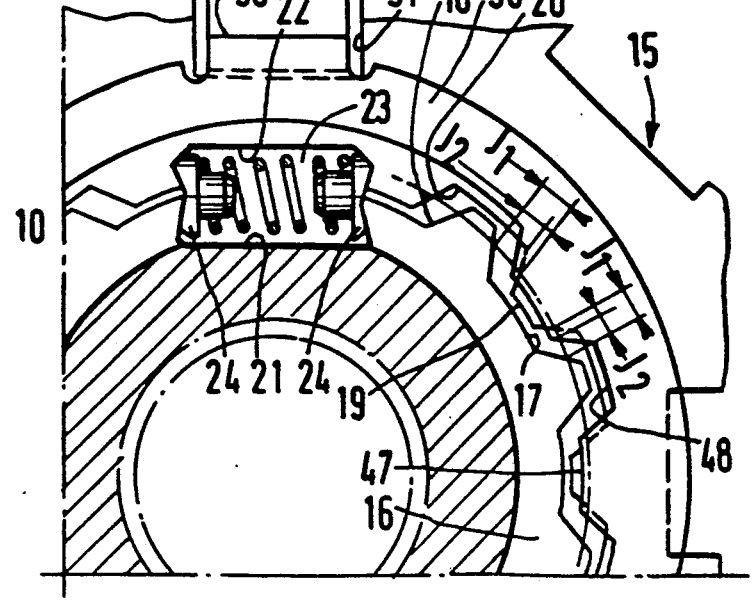
FIG. 3 is a view in partial transverse cross section, taken on the line III—III in FIG. 2.

Circumferentially acting resilient centring means are provided between the elements 10 and 15, for returning them mutually into their median relative rest position as shown in FIG. 3. In this example, these centring, or return, means comprise at least two coil springs 23 of low stiffness, which are diametrically opposed to each other. Only one of the springs 23 is shown in FIG. 3. The springs 23 act on thrust inserts 24 having an outer or thrust face in dihedral or notched form. One of these thrust inserts is interposed between each end of a spring 23 and the circumferential ends of two slots 21 and 22, which are provided respectively in the hub 10 and in the damper plate 15 for accommodating the springs 23. The slots 21 and 22 interrupt the series of alternating teeth and recesses of the loose meshing means, since they are formed respectively on the inner periphery of the damper plate 15 and on the outer periphery of the flange 16.

The disc 11 is fixed with respect to two guide rings 25 and 25', for rotation therewith. These guide rings extend parallel to the damper plate 15 and on either side of the latter, and are connected to each other through spacers, which in this example are in the form of spacer bars 26 extending through the damper plate 15. The disc 11 is part of the second one of the two coaxial parts of the assembly, and is secured to the guide ring 25 by means of rivets, not shown.

Circumferentially acting resilient return means are provided between the guide rings 25, 25' and the damper plate 15. In this example, these resilient means consist of coil springs 30 which are of greater stiffness than the springs 23. The springs 30 are mounted without any clearance in windows which are formed in the guide rings 25 and 25'. These springs also lie in further windows, generally aligned with the windows in the guide rings but formed in the damper plate 15. In order to give a sequential action to the springs 30, some of the latter are mounted without clearance in the windows of the damper plate 15, while others, also mounted in these windows, are so mounted with a circumferential clearance.

A friction ring 32 is disposed between the guide ring 25 and the damper plate 15, in contact with a face of the latter radially outside the teeth 19 and recesses 20 of the loose meshing coupling. An annular bearing 33, of L-shaped cross section, is interposed, partly in the radial sense between the outer periphery of the hub 10 and the inner periphery of the guide ring 25, and partly in the axial sense between the guide ring 25 and the flange 16. A metal washer 34 is inserted between the flange 16 and the bearing 33.

A first resilient gripping means is arranged between the other side of the damper plate 15 and the guide ring 25', at generally the same radius as the friction ring 32. This first gripping means comprises, successively, an axially acting resilient gripping ring 39 which is in contact with the guide ring 25', and which comprises in this example an ONDUFLEX ring; then a metallic spacing ring 40, which will be referred to here as a contact ring and which is provided with two radial extension portions 41, diametrically opposed to each other and slotted for engagement on the spacer bars 26 so as to be coupled for rotation with the latter; and finally, a friction ring 38 which is in contact with the damper plate 15. The friction ring 38 will be referred to here as a draw ring, and is gripped between the contact ring 40 and the damper plate 15. The gripping action of the gripping ring 39 takes place not only on the draw ring 38 but also on the friction ring 32. Radially inward of the arrangement just described, a further resilient gripping ring 44 is in contact with the guide ring 25', and biases a metallic ring 45 towards the flange 16, through a spacing ring 43 and a friction ring 42.

With this arrangement, the gripping of the rings 32 and 38, and of the friction ring 42, is achieved independently of any assistance by the springs 39 and 44. The load which is exerted by the gripping ring 39 is generally greater than that which is exerted by the gripping ring 44, the ring 39 being adapted to the springs 30, the stiffness of which is, as already mentioned, generally greater than that of the springs 23. The stiffness of the springs 23 is so chosen as to adapt them for good suppression of the noises known as dead centre noises.

The draw ring 38 (FIG. 3) has on its inner periphery a set of teeth 47 of trapezoidal shape, each of which is engaged in the recesses 17 of the flange 16, for which purpose the width of the latter is greater than the axial thickness of the damper plate 15. The teeth 47 are engaged in the recesses 17 with a circumferential clearance J2, which is smaller than the clearance J1 mentioned above, and are spaced apart at regular intervals circumferentially so as to define between each tooth 47 and the next a recess 48. The teeth 18 of the flange 16 are engaged in these recesses 48 with the clearance J2. It should be noted that this arrangement is also present in the embodiments of the invention which are described below with reference to FIGS. 4 to 11.

The draw ring 38 has on its outer periphery an axial lug 50 which is engaged in a slot 51 formed in the damper plate, with a circumferential clearance J3 on either side of the tab 50. As is indicated in FIG. 3, the clearance J3 is equal to or greater than (J1−J2), but equal to or less than (J1+J2).

The device operates in the following manner. In a first phase of operation, the damper plate 15 is fixed with respect to the guide rings 25 and 25', through the action of the springs 30, and is displaced with respect to the hub 10 against the action of the springs 23 and against the action of a first friction means comprising the bearing 33 and the rings 44, 43, 42, 45 and 34. The friction ring 32 is inoperative during this first phase.

In a second phase of operation, before the clearance J1 has been taken up to mark the entry of the springs 30 into operation, the clearance J2 between the draw ring 38 and the hub 10 is taken up by the teeth 47 coming into contact with the teeth 18. This causes a friction torque to be developed by the draw ring 38, such as to minimise the consequences of any possible bouncing between the hub 10 and the damper plate 15.

In a third phase of the operation, after the clearance J1 has been taken up so that the hub 10 is now driven in rotation by the damper plate 15, the springs 30 become compressed and the guide rings 25 and 25' are displaced with respect to the damper plate 15, against the resistance offered by the friction ring 32.

The draw ring 38 is therefore, in the second phase, able to slide freely in the circumferential direction between the contact ring 40 and the damper plate 15. The tab 50 ensures that the damper plate 15 will return into an appropriate angular position with absolute certainty; in particular, it prevents any possible gripping action happening between the draw ring 38 and contact ring 40. The draw ring 38 thus only begins to act during any large oscillations that may take place between the damper plate and the hub 10, since these oscillations cause it to slide circumferentially, first in one direction and then in the other.

The invention itself is illustrated in various forms in FIGS. 4 to 11, in which there are to be seen, associated with the draw ring, for example 138 in FIG. 4, 138 in FIG. 6, 238 in FIG. 8, second resilient gripping means indicated at 160 in FIGS. 4 and 6, 170 in FIGS. 5, 7 and 11, 270 in FIG. 8, 260 in FIG. 9, and 370 in FIG. 10. In FIGS. 5, 7, 9, 10 and 11 the draw ring and second gripping means are combined in a single element 170, 260 or 370. The second resilient means, together with the draw ring, are confined axially between a contact ring (such as 133 in FIGS. 4 to 8 and FIG. 10, or 140 in FIG. 9) and the damper plate 15, by means of an axial protuberance 156 which is fixed with respect to at least one of the elements comprising the damper plate and the appropriate contact ring. The draw ring is urged into contact with the damper plate 15 or on the contact ring 133 or 140, as the case may be, under the biassing action of the second resilient gripping means. The latter then bears on the other one of the elements consisting of the contact ring 133 or 140 or the damper plate 15; or on the axial protuberance 156.

In FIGS. 4 to 7, the bearing element 33 (FIG. 2) and the friction ring 32 (FIG. 2) are replaced by a single member 133, which consists of a bearing member constituting the contact ring 133 mentioned above. In a modification (indicated in broken lines in FIG. 5) the bearing member 133 may however be in two parts.

In FIGS. 4 to 7, the bearing member 133 is recessed on its side facing the damper plate 15, for accommodation of the draw ring and its associated second resilient gripping means, (138, 160, FIG. 4; 170, FIGS. 5 and 7; 138, 160, FIG. 6). The draw ring 138 bears on either the damper plate 15 or the bearing member 133, under the biassing action of the gripping means 160 or 170 which engages axially on the other one of these two elements, i.e. respectively, the bearing 133 or damper plate 15.

The ring 140 is present in all of FIGS. 4 to 10, interposed between the damper plate 15 and the guide ring 25'. It is a friction ring 140, having a plurality of projecting bosses 141 which are engaged in corresponding openings 142 formed in the guide ring 25', so as to couple the friction ring 140 with the latter for rotation with it. The gripping ring 39, which is in the form of a Belleville ring, bears on the guide ring 25' so as to bias the ring 140 into contact with the damper plate 15 and to grip the bearing member 133, with the effective thrust thus passing through the protuberance 156 or axial spacer and by-passing the draw ring and its associated second resilient gripping means.

Radially inward of the ring 140, there is an annular bearing 143 of L-shaped cross section (FIGS. 4 and 6), which is in contact through its transverse portion with the flange 16, and which is also in contact, through its internal bore, with an axially oriented peripheral surface 144 of the hub 10. The ring 44, which is again in the form of a Belleville ring, bears on the guide ring 25' so as to bias the bearing 143 into contact with the flange 16.

In FIG. 4, the bearing member 133 has a plurality of projecting bosses 150, each of which is engaged in a corresponding opening 151 formed in the guide ring 25, so as to couple the latter with the bearing member 133 for rotation together. The bearing member 133 also has an annular crown portion which is interposed radially between the inner periphery of the guide ring 25 and an annular surface 154, formed axially on the outer periphery of the hub 10. The bearing member 133 also has a transverse ring portion 155 which acts as a spacing ring between the guide ring 25 and the flange 16, with the outer periphery of the ring portion 155 being joined to the protuberance 156 extending axially into contact with the damper plate 15.

Figure 2:
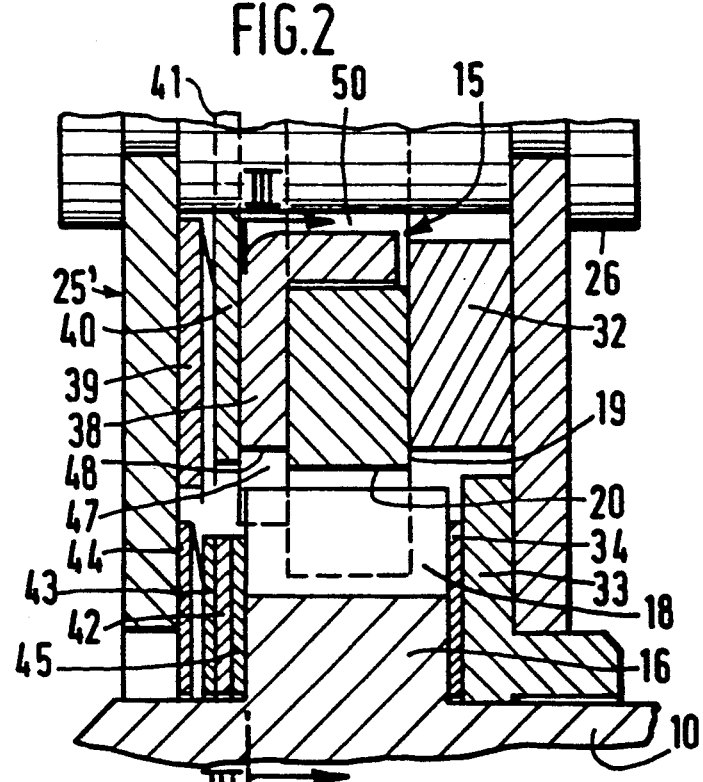
FIG. 2 repeats, on a larger scale, the detail which is indicated in FIG. 1 by a box in phantom lines.

The protuberance 156, which is annular in shape and which may be divided into sections, fulfils the same function as the friction ring 32 in FIG. 2 during the movement between the hub 10 and the damper plate 15, with a relative movement taking place between the protuberance 156 and the damper plate 15, against which it is urged under the action of the gripping ring 39.

The protuberance 156 lies radially outward of the bosses 150, which are themselves disposed radially outside the above mentioned crown portion of the bearing member 133 and which are integral with the ring portion 155. The protuberance 156, together with the flange 16 and the ring portion 155, defines a hollow housing in which the draw ring 38, together with the associated resilient gripping ring 160, are mounted. The gripping ring 160 bears directly on the damper plate 15 so as to urge the draw ring 38 into contact with the transverse portion 155, on the surface of the latter which faces towards the damper plate 15.

The internal diameter of the Belleville ring 160 is greater than that of the flange 16, and it may be centred by the protuberance 156, as may the draw ring 138.

As will have been understood from the foregoing, it is possible to predetermine at will what is to be the thrust exerted by the Belleville ring 160. The gripping ring 39 exerts its thrusts on the protuberance 156 and is relieved by the Belleville ring 160, which is made to have lower stiffness. When the draw ring 38, sliding circumferentially, comes into operation, it makes frictional contact with the bearing member 133 which is meshed with the hub 10. In other respects, the operation is identical with that of FIG. 1, with the draw ring 138 starting to act before the springs 30, due to the clearance J2 in FIG. 3.

The arrangement shown in FIG. 5 is similar to that of FIG. 4, except that a single resilient ring 170, acting axially, combines the functions of draw ring and second resilient gripping means. The ring 170 has alternate teeth and recesses in which the teeth of the hub are engaged. The outer portion of this draw ring 170 is in the form of a Belleville ring and is in contact with the damper plate 15, while it is in contact through its inner periphery with the ring portion 155 of the bearing member 133.

In FIG. 6, as in FIG. 4, two separate rings 160 and 138 are provided as already mentioned, but in this case their positions are reversed, with the ring 138 being in engagement against the damper plate 15 while the Belleville ring 160 bears on the transverse portion 155 of the bearing member 133, being centred by the latter by virtue of an axially extending shoulder 171 formed on the portion 155.

In FIG. 6 the bearing member 133 is mounted freely with respect to the guide ring 25, the holes 151 in the latter being unoccupied. The bearing member 133 is instead coupled in rotation to the damper plate 15 by means of axial projections 180 which are spaced apart at regular intervals, for example at 120 degrees, circumferentially on the bearing member 133 and which engage in complementary openings 181 formed in the damper plate 15. In a modification, instead of these projections 180, axial tabs may be provided, each of which is engaged in a complementary slot formed in the damper plate 15.

It will be noted that in FIG. 6, the guide ring 25 is provided on its inner periphery with an annular, axially extending flange 190 which increases the axial bearing surface between the ring 25 and the bearing member 133. It will also be appreciated that, by contrast with the embodiments shown in FIGS. 4 and 5, the draw ring 138 is only subject to friction during its actual operation, since, after the damper plate 15 and the hub 10 have become meshed together for mutual rotation, no relative movement occurs between the bearing member 133 and the damper plate 15.

It will be noted that the projections 180 are located radially outward of the protuberance 156. In FIG. 6 the bearing member 133 may be mounted with a radial clearance between it and the carrying surface 154 of the hub, the damper plate 15 being centred with respect to the guide ring 25 by means of the bearing member 133. In all embodiments, this arrangement may be adopted so as to allow out of balance effects to be minimised.

FIG. 7 is a view similar to FIG. 5, with the bearing member 133 coupled for rotation with the damper plate 15. The bearing member 133 has radial projections 180 as in FIG. 6, but in this case each projection 180 is provided with fingers 182, extending axially and each having a free end in the form of a hook. The fingers 182 are separated by a gap 183, whereby the bearing member 133 is clipped into the damper plate 15 by a snap fit. The projections 180, after the fingers 182 have passed through the corresponding holes 181 in the damper plate, are hooked against the face of the damper plate which faces towards the guide ring 25'. This enables a sub-assembly to be created, consisting of the bearing member 133, the damper plate 15 and the gripping ring 170. In a modification, which is shown in broken lines in FIG. 6, the projections 180 extend beyond the holes 181 and are secured to the damper plate 15 using ultrasonic welding. Apart from the facility to build a sub-assembly, this arrangement allows full relaxation of the ring 39 to be avoided.

Referring now to FIG. 8, the draw ring is here divided into two rings 238, which are in contact respectively with the damper plate 15 and the bearing member 133. The associated second resilient gripping means, which here takes the form of a resilient corrugated ring 270, is interposed between the two rings 238.

One of these rings 238 has a serpentine or cranked shape in cross section at its inner periphery, so as to define an axial offset for engagement with the other ring 238. It is the damper plate 15 that carries the axial protuberance, here denoted as 280, through which the gripping forces are transmitted, the bearing member 133 being in engagement, through its transverse portion 155, with the protuberance 280. The latter here consists of a plurality of circular segments, which are preferably formed by orbital forging so as not to weaken the damper plate 15. This arrangement could of course also be applied to the arrangement shown in FIG. 2, with the contact ring 40 being in engagement on a plurality of projections carried by the damper plate 15 so as to confine the draw ring 38, with its associated resilient gripping means, between the contact ring 40 and the damper plate 15.

In FIG. 9, it is the friction ring 140 which constitutes the contact ring in accordance with the invention. This ring is recessed so as to define a cavity 257 in which the draw ring, 260, is housed. The draw ring 260 is springy with a serpentine cross sectional shape, having its outer periphery partly bent over for engagement against the contact ring 140, and also having a radially extending portion at its inner edge for engagement on the teeth of the damper plate 15 and for meshing with the hub 10. It will be noted that the gripping ring 39 extends radially outwards beyond the draw ring 260, so as again to exert its thrusts on the protuberance 156.

Referring now to FIG. 10, the bearing member 133 is centred with respect to the damper plate 15, being driven in rotation by means of projections 380 of the latter, with each of these projections engaging in a corresponding blind hole 381 formed in the bearing member 133. The blind holes 381 are formed in the outer periphery of the bearing member 133. The draw ring, here indicated at 370, is resilient and comprises a Belleville ring with a radially extending portion at its radially inner part engaging against the bearing member 133 and meshing with the hub 10.

It will be noted that the bearing member 133 in FIG. 10 has a small radial flange 200, which is in contact with the damper plate 15 and which forms a radial extension of the protuberance 156 so as to define a shoulder for engagement by the Belleville ring 370. This flange 200 is non-continuous in this case, and at 201 can be seen corresponding holes which are provided in the bearing member 133 for the purpose of enabling the flange 200 to be stripped from the mould. The flange 200 also defines a shoulder for the force fitting of the draw ring 370 into the bearing member 133, during which the draw ring 370 is deformed to allow the flange 200 to pass. The draw ring 370 preferably has a crenellated outer edge to facilitate fitting.

As will have been gathered from the foregoing, whereas in the other Figures, except FIG. 7, the force exerted by the second resilient gripping means 160, 170, 270 relieves the first resilient gripping means 39, here in FIG. 10 the draw ring 370 acts within the bearing member 133 in such a way that the force exerted by the ring 39 may be calculated to the best advantage for achieving a better damping effect.

The same is true in FIG. 11, in which the flange 200 is continuous. To this end, the contact ring may be in two parts, 233 and 233', fastened to each other for example by adhesion, by ultrasonic welding, or by means of a snap fit.

Still referring to FIG. 11, the bearing member, comprising the contact ring 233, 233', has projecting bosses 180 like the bearing member 133 in FIG. 6. It is the portion 233' that carries these bosses 180, and the flange 200 which defines a shoulder 202 for the draw ring 170, the latter being identical with, for example, the draw ring 170 in FIG. 7. The portion 233' has further projections 480, which also define shoulders and each of which engages in an opening 481 formed in the portion 233 of the bearing member for coupling the two portions of the latter together for simultaneous rotation. The protuberance 156 is then in this case carried on the portion 155 of the bearing member. This modification may also be applied to the arrangements shown in the other Figures.

As will be evident from the foregoing description and from the drawings, the version of the torsion damping device exemplified in FIGS. 4, 5 and 9 avoids the need to modify the guide rings and the damper plate of a conventional torsion damper, while the version exemplified in FIG. 6, 7, 8 and 10 does necessitate modification of the damper plate 15. In all these cases advantage is taken of the fact that the flange 16 is wider than the damper plate 15, so as to delimit the cavity for housing the draw ring. Advantageously, the contact ring 133, 140 is in plastics material having a fibre reinforcement and presenting a low coefficient of friction. It is possible to arrange for resilient tongues to project direct from the contact ring so as to form the second resilient gripping means.

In every case, the damper plate 15 and the contact ring 133, 140, together with the protuberance 156, delimit a housing, with the damper plate 15 forming either a cover element of the latter (for example as in FIG. 9), or the hollow part of the housing (as in FIG. 8), and with the second resilient gripping means being able to come into engagement on the protuberance 156, the latter forming the axially extending skirt of the housing.

In FIGS. 4, 5, 6, 8 and 9, the force exerted by the ring 39 is of course greater than that exerted by the rings 160, 170, 270.

It will be understood that the present invention is not limited to the various embodiments described above. In particular, the arrangement exemplified in FIGS. 4 to 7 may be equipped with the friction rings and gripping rings described with reference to FIG. 2, and the protuberance 156 may be in the form of a continuous and closed annulus, such that penetration of dust is minimised. In a modification, it may be formed of at least two diametrically opposed portions. In another modification, the damper plate 15 and the contact ring 133, 140 may each have axial protuberances which are located facing each other. The bearing member may be coupled to the guide ring 25 for rotation with the latter by means of projections formed on the axial crown of the bearing member 133, these projections engaging in complementary notches formed for this purpose in the guide ring 25. Washers may be interposed between the draw ring 38, 170 and the damper plate 15 or the portion 155.

A washer may of course, for example in the FIG. 4 arrangement, be interposed between the damper plate 15 and the ring 160; and a washer may be interposed between the draw ring 38 and the bearing member 133.

The resilient centring means 23, as described in French published patent application No. FR 2 613 800A, may form part of a predamper which is arranged between the damper plate 15 and one of the guide rings 25 or 25', with a disc or radial plate being coupled to the hub for rotation with the latter and with two guide rings being arranged on either side of the hub. The bearing member 133 then serves for centring and for driving the guide rings. In this case advantage may be taken of the arrangement shown in FIG. 9. Finally, the friction disc 11 may be secured directly to an engine flywheel.

What is claimed is:

1. A torsion damping device comprising a first part; a second part; means mounting said first and second parts coaxially and in opposed facing relationship for mutual relative rotation; circumferentially acting resilient return means interposed between said parts for resisting said relative rotation; and means associated with said parts for limiting said relative rotation within a predetermined range of angular displacement, said first part comprising two coaxial elements, namely a radial damper plate and a hub mounting the damper plate coaxially and rotatably thereon; said second part comprising two guide rings arranged on either side of said damper plate and connected to each other through spacers extending through said damper plate, said device comprising further resilient centering means for biasing the damper plate to a predetermined rotational position on the hub; and a draw ring coaxial with the hub and having radial first tooth means at its inner periphery, said coaxial elements having loose meshing means comprising a radial second tooth means on each said element, the respective said first and second tooth means meshing with each other but defining a circumferential clearance for permitting but limiting the relative rotation between said coaxial elements, the first tooth means being engaged in the second tooth means of the hub, and said return means being stiffer than said centering means, wherein the device further comprises:

a contact ring being interposed between said damper plate and one of said guide rings; first resilient gripping means bearing on one of said guide rings and interposed between said one guide ring and said damper plate for biasing said contact ring towards said damper plate; second resilient gripping means associated with the draw ring; and a coaxial protuberance, fixed with respect to at least one of the damper plate and contact ring, a cavity defined in part by said protuberance, the draw ring and second gripping means being housed in said cavity radially inward of said protuberance and axially between the contact ring and the damper plate, the draw ring being in bearing engagement on one of said damper plate or said contact ring under the influence of the second resilient gripping means engaging on the other one of said contact ring or said damper plate or on the axial protuberance, said second resilient gripping means having a stiffness lower than that of the first resilient gripping means.

2. A device according to claim 1, wherein the said draw ring is separate from the associated second resilient gripping means.

3. A device according to claim 1, wherein said draw ring is integral with the associated second resilient gripping means.

4. A device according to claim 1, wherein the second resilient gripping means engage on a shoulder which is fixed with respect to the axial protuberance.

5. A device according to claim 2, wherein the draw ring is divided into two rings carried respectively on the damper plate and the contact ring.

6. A device according to claim 1, wherein the contact ring is constituted by an annular bearing member, having an L-shaped cross section, interposed, firstly, radially between the hub and one guide ring, and secondly, axially between the said guide ring and the damper plate, said bearing member being recessed facing towards the damper plate for accommodation of the said draw ring and the associated resilient gripping means.

7. A device according to claim 6, wherein said protuberance is axially orientated and carried by the bearing member, being fixed with respect to a transverse portion of said bearing member and interposed axially between the associated guide ring and a radial flange, which is formed as part of the hub so as to define its tooth means, with said draw ring and its associated second resilient gripping means being mounted in a cavity defined by said protuberance together with said transverse portion and said radial flange.

* * * * *